US 12,064,728 B2

United States Patent
Lee et al.

(10) Patent No.: US 12,064,728 B2
(45) Date of Patent: Aug. 20, 2024

(54) ELECTRODEIONIZATION FILTER

(71) Applicant: COWAY Co., Ltd., Gongju-si (KR)

(72) Inventors: Sang-Young Lee, Seoul (KR); Sang-Hyeon Kang, Seoul (KR); Chul-Ho Kim, Seoul (KR); Tae-Seong Kwon, Seoul (KR); Hyoung-Min Moon, Seoul (KR); Sung-Min Moon, Seoul (KR); Jun-Young Lee, Seoul (KR); Byoung-Phil Lee, Seoul (KR); Byung-Sun Mo, Seoul (KR); Guk-Won Lee, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 1071 days.

(21) Appl. No.: 16/962,122

(22) PCT Filed: Jan. 8, 2019

(86) PCT No.: PCT/KR2019/000261
§ 371 (c)(1),
(2) Date: Jul. 14, 2020

(87) PCT Pub. No.: WO2019/139327
PCT Pub. Date: Jul. 18, 2019

(65) Prior Publication Data
US 2020/0406195 A1   Dec. 31, 2020

(30) Foreign Application Priority Data

Jan. 15, 2018 (KR) .......... 10-2018-0005194

(51) Int. Cl.
*B01D 61/48*  (2006.01)
*B01D 61/44*  (2006.01)
(Continued)

(52) U.S. Cl.
CPC ........... *B01D 61/48* (2013.01); *B01D 61/445* (2013.01); *B01D 69/02* (2013.01); *C02F 1/4695* (2013.01);
(Continued)

(58) Field of Classification Search
CPC .............. B01D 61/44–54; B01D 69/04; B01D 2313/345; C02F 1/4693–4695
See application file for complete search history.

(56) References Cited

U.S. PATENT DOCUMENTS 3,038,848 A * 6/1962 Brewer .............. G01N 27/4045
205/785.5
3,287,249 A * 11/1966 Braithwaite .............. C25B 9/70
204/260
(Continued)

FOREIGN PATENT DOCUMENTS

| CN | 104556315 A | 4/2015 |
| CN | 105461021 A | 4/2016 |

(Continued)

OTHER PUBLICATIONS

International Search Report issued on Apr. 12, 2019 in PCT/KR2019/000261 filed on Jan. 8, 2019, citing documents AA-AE and AO-AR therein, 2 pages.
(Continued)

*Primary Examiner* — Luan V Van
*Assistant Examiner* — Andrew Koltonow
(74) *Attorney, Agent, or Firm* — Oblon, McClelland, Maier & Neustadt, L.L.P.

(57) ABSTRACT

An electrodeionization filter includes: a housing having a water inlet and a water outlet; a first electrode installed inside the housing in a spiral shape; a second electrode installed inside the housing in a spiral shape so as to be spaced apart from the first electrode; and an ion exchange
(Continued)

module installed between the first electrode and the second electrode for adsorbing or desorbing ionic substances contained in water introduced by an application of electricity. At least one of the first electrode and the second electrode has a structure in which a center portion thereof is denser than a peripheral region thereof. Accordingly, the lifespan of the electrodes of the electrodeionization filter can be increased, and the assembly of the electrodes and related parts can be easily facilitated.

13 Claims, 10 Drawing Sheets

(51) Int. Cl.
    *B01D 69/02*     (2006.01)
    *C02F 1/469*     (2023.01)

(52) U.S. Cl.
    CPC .... *B01D 2313/345* (2013.01); *B01D 2325/42* (2013.01)

(56) References Cited

U.S. PATENT DOCUMENTS

| | | | |
|---|---|---|---|
| 6,380,746 B1* | 4/2002 | Polczynski | G01N 33/2888 324/439 |
| 8,444,847 B1* | 5/2013 | Evans | C25B 1/04 205/633 |
| 8,562,803 B2 | 10/2013 | Nyberg et al. | |
| 9,090,493 B2 | 7/2015 | Nyberg et al. | |
| 2007/0108056 A1 | 5/2007 | Nyberg et al. | |
| 2009/0124984 A1* | 5/2009 | Hanawa | C25D 13/12 607/9 |
| 2011/0240474 A1* | 10/2011 | Seed | C02F 1/4691 204/660 |
| 2014/0027288 A1* | 1/2014 | Nyberg | B01D 61/54 204/663 |
| 2014/0246318 A1 | 9/2014 | Yang et al. | |
| 2014/0374258 A1* | 12/2014 | Hui | C02F 1/4604 204/554 |
| 2015/0076410 A1* | 3/2015 | Schlichting | B01J 8/065 422/208 |
| 2016/0258795 A1* | 9/2016 | Farhadiroushan | G02B 6/4415 |
| 2018/0326356 A1 | 11/2018 | Moon et al. | |
| 2019/0111393 A1* | 4/2019 | Winter | B01D 63/10 |
| 2020/0070093 A1* | 3/2020 | Xia | B01D 61/445 |

FOREIGN PATENT DOCUMENTS

| | | |
|---|---|---|
| CN | 105540763 A | 5/2016 |
| KR | 10-0501417 B1 | 7/2005 |
| KR | 10-1333243 B1 | 11/2013 |
| KR | 10-1591257 B1 | 2/2016 |
| KR | 10-2017-0058853 A | 5/2017 |
| KR | 10-2017-0062986 A | 6/2017 |

OTHER PUBLICATIONS

Combined Chinese Office Action and Search Report issued Dec. 31, 2021 in corresponding Chinese Patent Application No. 201980008581.4 (with English Translation) citing documents AA, AO-AQ therein, 17 pages.

Combined Chinese Office Action and Search Report issued Jul. 22, 2022 in Chinese Patent Application No. 201980008581.4 (with English translation), citing document 24 therein, 17 pages.

Wu, Renfang, et al., "Power Plant Chemistry", Beijing: China Electric Power Press, pp. 131-132 with cover pages, Aug. 2004, Edition 3 (with English abstract).

\* cited by examiner

ELECTRODEIONIZATION FILTER

TECHNICAL FIELD

The present disclosure relates to an electrodeionization filter, more specifically to an electrodeionization filer configured to adsorb and remove an ionic substance contained in raw water using electric force.

BACKGROUND ART

Recently, research into an electrodeionization filter removing ionic substances or the like contained in raw water using electrical attraction has been actively conducted.

As an example, Korean Patent Application No. 2015-0168858, filed by the Applicant, has suggested a technology involving the use of a bipolar ion exchange membrane including a cation exchange membrane and an anion exchange membrane as well as an electrodeionization filter performing a deionization operation using such an ion exchange membrane.

Due to the facts that there has simply been research only into ion exchange membranes and that lifespans of electrodes are not sufficiently considered, however, conventional electrodeionization filters have a problem in that the electrodes have a short lifespan.

PRIOR ART

Korean Laid-Open Publication Application NO. 2017-0062986

DISCLOSURE

Technical Problem

The present disclosure is to resolve at least a portion of conventional technical problems stated above and is to provide an electrodeionization filter capable of increasing lifespans of electrodes.

As an aspect, the present disclosure is to provide an electrodeionization filter in which electrodes are easily assembled.

Technical Solution

According to an aspect of the present disclosure, an electrodeionization filter including a housing equipped with a water inlet and a water outlet; a first electrode installed inside the housing in a spiral form; a second electrode installed inside the housing and spaced apart from the first electrode in a spiral form; and an ion exchange module installed between the first and second electrodes and configured to adsorb or detach an ionic substance in water introduced by electricity applied thereto, wherein at least one of the first and second electrodes has a structure in which a center region is denser compared to a peripheral region is provided.

The first and second electrodes may have a structure in which the center region of the first and second electrodes is denser compared to the peripheral region of the first and second electrodes.

The electrodeionization filter may further include a core member installed inside the ion exchange module and formed with an outlet through which purified water deionized in the ion exchange module, wherein the first electrode is spirally coiled around an external surface of the core member.

The first electrode may be introduced into the ion exchange module through a fixing groove formed in the core member, and the center region of the first electrode may correspond to the central portion of three equally divided portions between the fixing groove and an upper end of the core member, and the peripheral regions of the first electrode may correspond to regions above and below the center region.

An electrodeionization filter according to an example embodiment may further include a support member installed outside the ion exchange module and disposed with an opening, and the second electrode may be spirally coiled around an external surface of the support member.

The second electrode may be introduced into the housing through a second electrode installation hole formed in a bottom surface of the housing, and the center region of the second electrode may correspond to the central portion of three equally divided portions between the second electrode installation hole and an upper end of the support member, and the peripheral regions of the second electrode may correspond to regions above and below the center region.

An average electrode pitch of the peripheral regions of the first and second electrodes may be two to ten times an average electrode pitch of the center regions.

The average electrode pitch of the center region of the first electrode may be 2 mm to 10 mm, and the average electrode pitch of the center region of the second electrode may be 1 cm to 3 cm.

The center region of the first electrode may have a denser structure compared to that of the second electrode.

The core member may include a fitting recess formed on an outer circumferential surface thereof to fix a position of the first electrode.

The ion exchange module may include bipolar ion exchange membrane formed by coupling a cation exchange membrane having a cation exchange resin and an anion exchange membrane having an anion exchange resin.

The housing may include a housing body in which an upper portion and a lower portion are exposed, an upper portion cover covering the upper portion of the housing body and a lower portion cover covering the lower portion of the housing body, wherein the lower portion cover may include first and second electrode installation portions through which the first and second electrodes are introduced into the housing, and the water inlet and outlet.

As another aspect, an electrodeionization filter including a housing equipped with a water inlet and a water outlet; a first electrode installed inside the housing in a spiral form; a second electrode installed inside the housing and spaced apart from the first electrode in a spiral form; and an ion exchange module installed between the first and second electrodes and configured to adsorb or detach an ionic substance in water introduced by electricity applied thereto, wherein at least one of the first and second electrodes has a structure in which one region is denser compared to the other region may be provided.

In addition, the technical solutions above are not entire features of the present disclosure. Various features and advantages and effects according thereto will be fully understood with reference to specific example embodiments below.

Advantageous Effects

According to an example embodiment, a lifespan of electrodes of an electrodeionization filter can be increased.

Further, according to an example embodiment, electrodes and relevant components are easily assembled.

MODE FOR INVENTION

Figure 1:
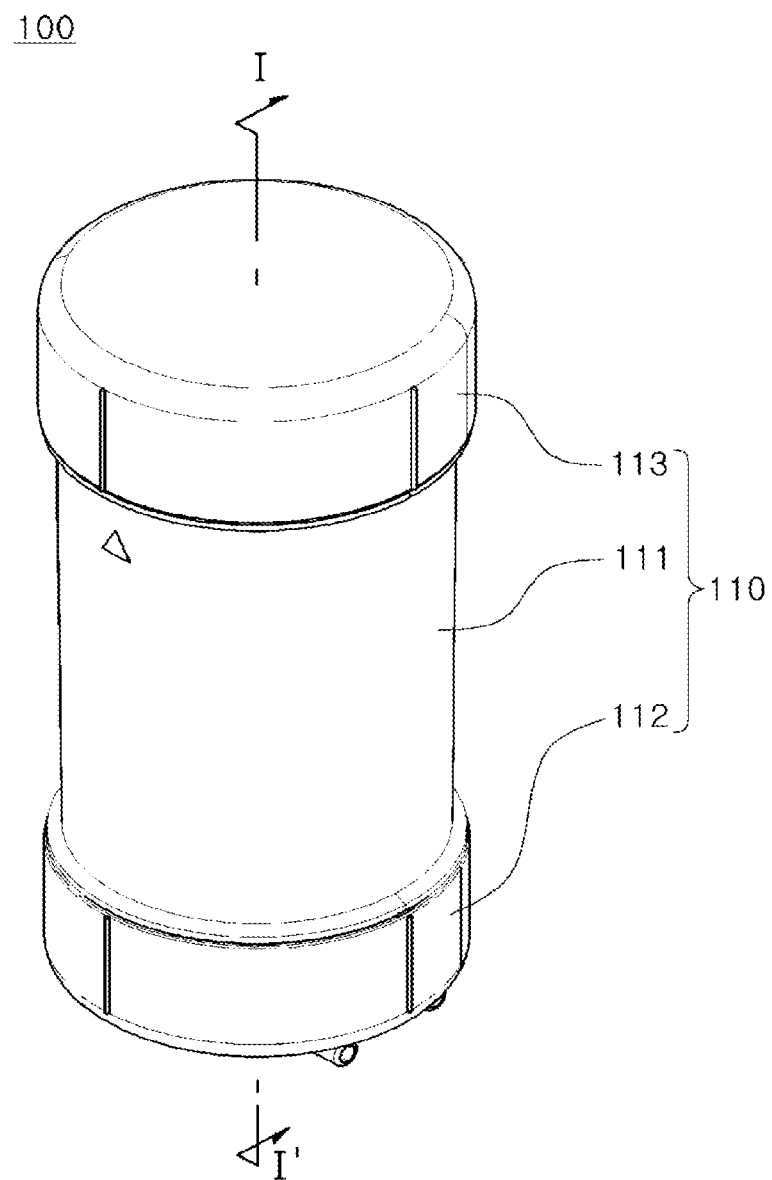
FIG. 1 is a perspective top view of an electrodeionization filter according to an example embodiment of the present disclosure.
Figure 2:
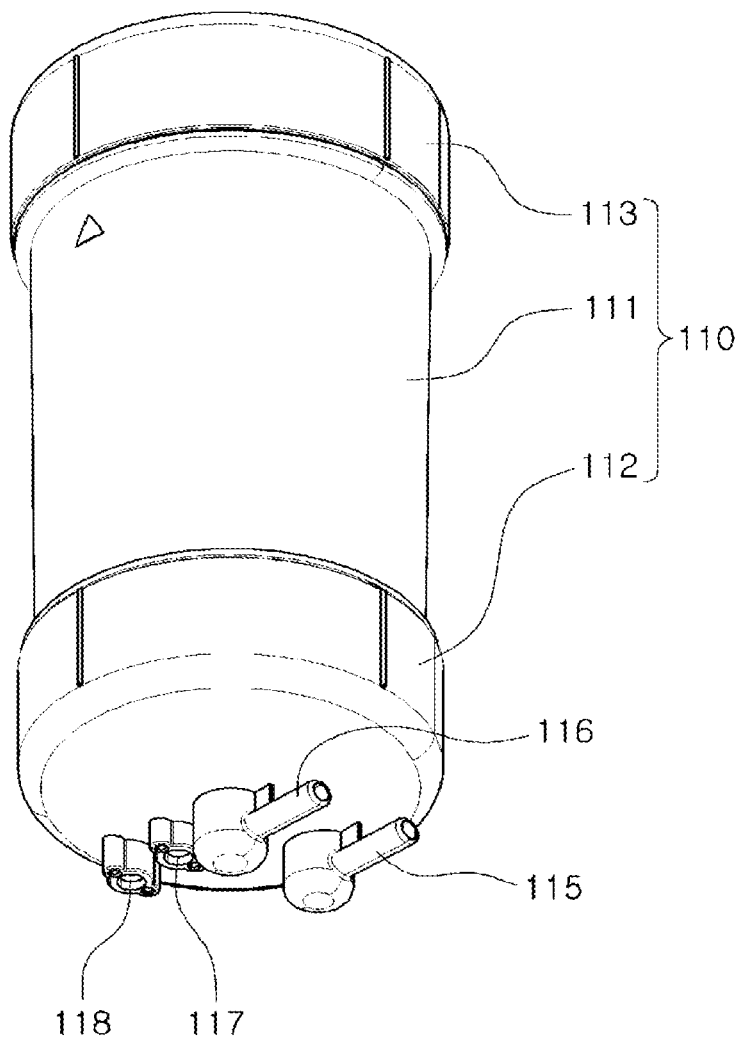
FIG. 2 is a perspective bottom view of the electrodeionization filter of FIG. 1.

Hereinafter, preferred example embodiments will be described in detail with reference to the accompanying drawings. However, the example embodiments may be modified in various embodiments and should not be construed as limiting the scope of the present disclosure. Further, the example embodiments are provided to help one of ordinary skill in the art fully understand the present disclosure. Shapes and sizes of components in the drawings may be exaggerated for more clearer explanation.

In addition, the same reference numerals may be used throughout the drawings for portions having similar functions and functions.

Hereinafter, the example embodiments will be described with reference to the accompanying drawings.

An electrodeionization filter according to an example embodiment may be configured to include, as illustrated in FIGS. 1 to 5, a housing 110, an ion exchange module 120, a first electrode 130 and a second electrode 140 and may further include a core member 150 and a support member 160 for installing the first and second electrodes 130 and 140.

The housing 110 is provided with a water inlet 115 through which raw water is introduced and a water outlet 116 through which deionized purified water is discharged. Further, the housing 110 is provided with a first electrode installation portion 117 and a second electrode installation portion 118 for installing the first and second electrodes 130 and 140.

For convenience of assembling an ion exchange module 120, and the like, which are described below, the housing 110 may be provided with a housing body 110 whose upper and lower portions are exposed, an upper portion cover 113 covering an upper portion of the housing body 111 and a lower portion cover 112 covering a lower portion of the housing body 111.

The water inlet and outlet 115 and 116, and the first and second electrode installation portions 117 and 118 may be provided in the lower portion cover 112. This facilitates easy tubing, or the like, to the water inlet and outlet 115 and 116, and an easy connection of the first and second electrodes 130 and 140 installed in the first and second electrode installation portions 117 and 118 to a power portion (not illustrated).

As previously, assembling characteristics can be improved by allowing various components connected to the outside of the housing 110 to be assembled in the lower portion cover 112.

The ion exchange module 120 is configured to include an ion exchange portion 121. The ion exchange portion 121 may be configured to include a cation exchange membrane 121a and an anion exchange membrane 121b coupled together or further include a water decomposition catalyst layer formed between the cation exchange membrane 121a and the anion exchange membrane 121b.

Figure 5:
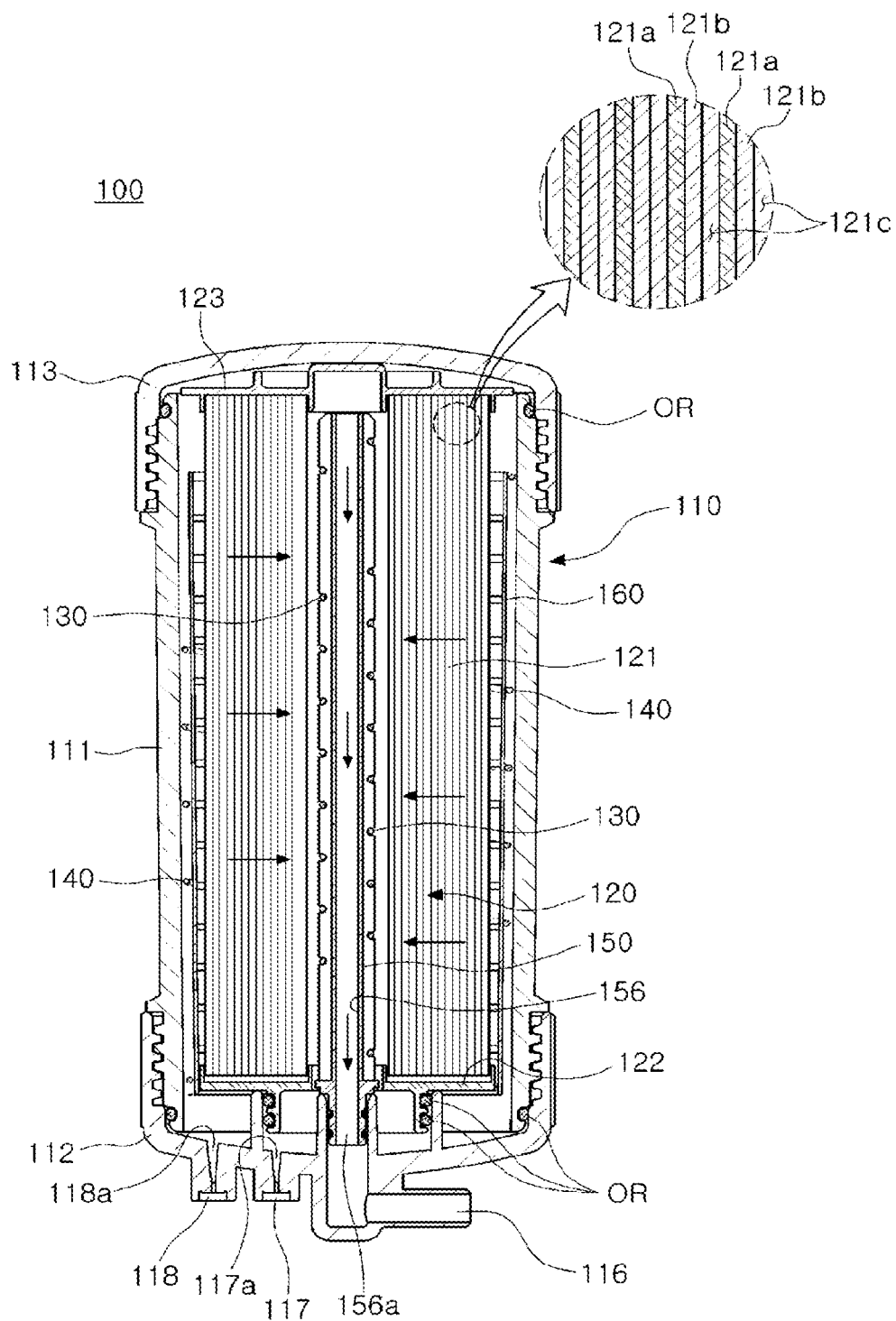
FIG. 5 is a longitudinal cross-sectional view of the electrodeionization filter of FIG. 1.

For example, as illustrated in FIG. 5, the ion exchange portion 121 may include a bipolar ion exchange membrane formed by coupling the cation exchange membrane 121a having a cation exchange resin and the anion exchange membrane 121b having an anion exchange resin. Alternately, the ion exchange portion 121 may be formed with a gap 121c allowing water to pass by a spacer, or the like, such that the water introduced into the housing 110 can be deionized by the ion exchange portion 121 while moving in a direction toward a center from an outer side of an internal space of the housing 110.

Such ion exchange portion 121 may purify water by adsorbing ionic substances in raw water using electric force and may regenerate by applying a reverse voltage.

An ion exchange portion 121 provided in the electric deionization filter 100 according to an example embodiment may be embodied in various forms as long as it can perform an electric deionization action, and is not limited to the previously described bipolar ion exchange membrane structure.

Meanwhile, the ion exchange module 120 may be provided with a lower cap 122 and an upper cap 123 configured to seal an lower portion and a lower portion, respectively, of the ion exchange portion 121 for forming an oil path from the outer side to the center. Further, a through-hole 122a inserted with the core member 150 to form a may be inserted in a center of the lower cap 122, thereby forming an oil discharging path.

The first electrode 130 may be installed inside the housing 110 in a spiral form, and the second electrode 140 may be installed inside the housing 130 and spaced apart from the first electrode 130 in a spiral form.

Figure 3:
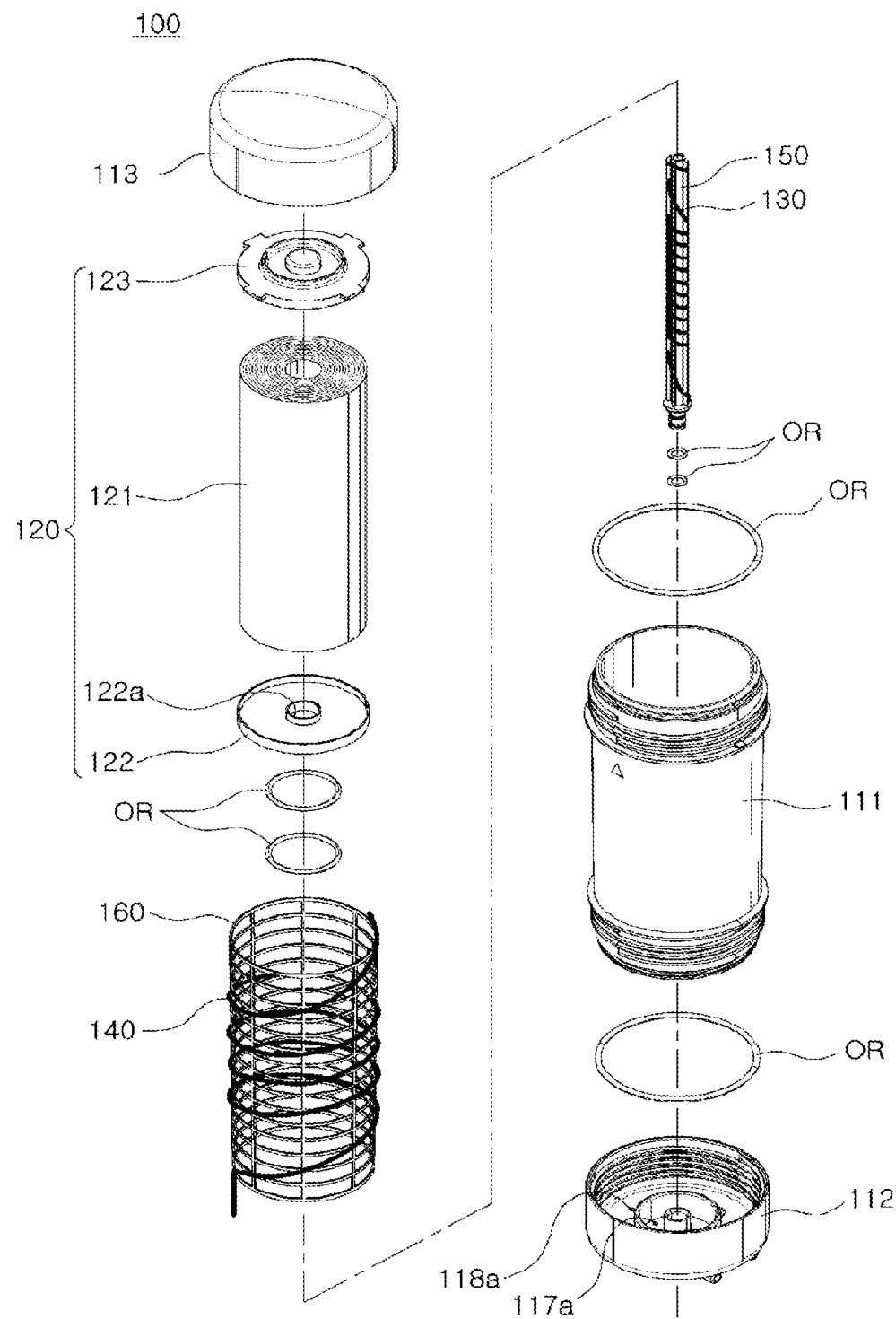
FIG. 3 is an exploded perspective top view of the electrodeionization filter of FIG. 1.
Figure 4:
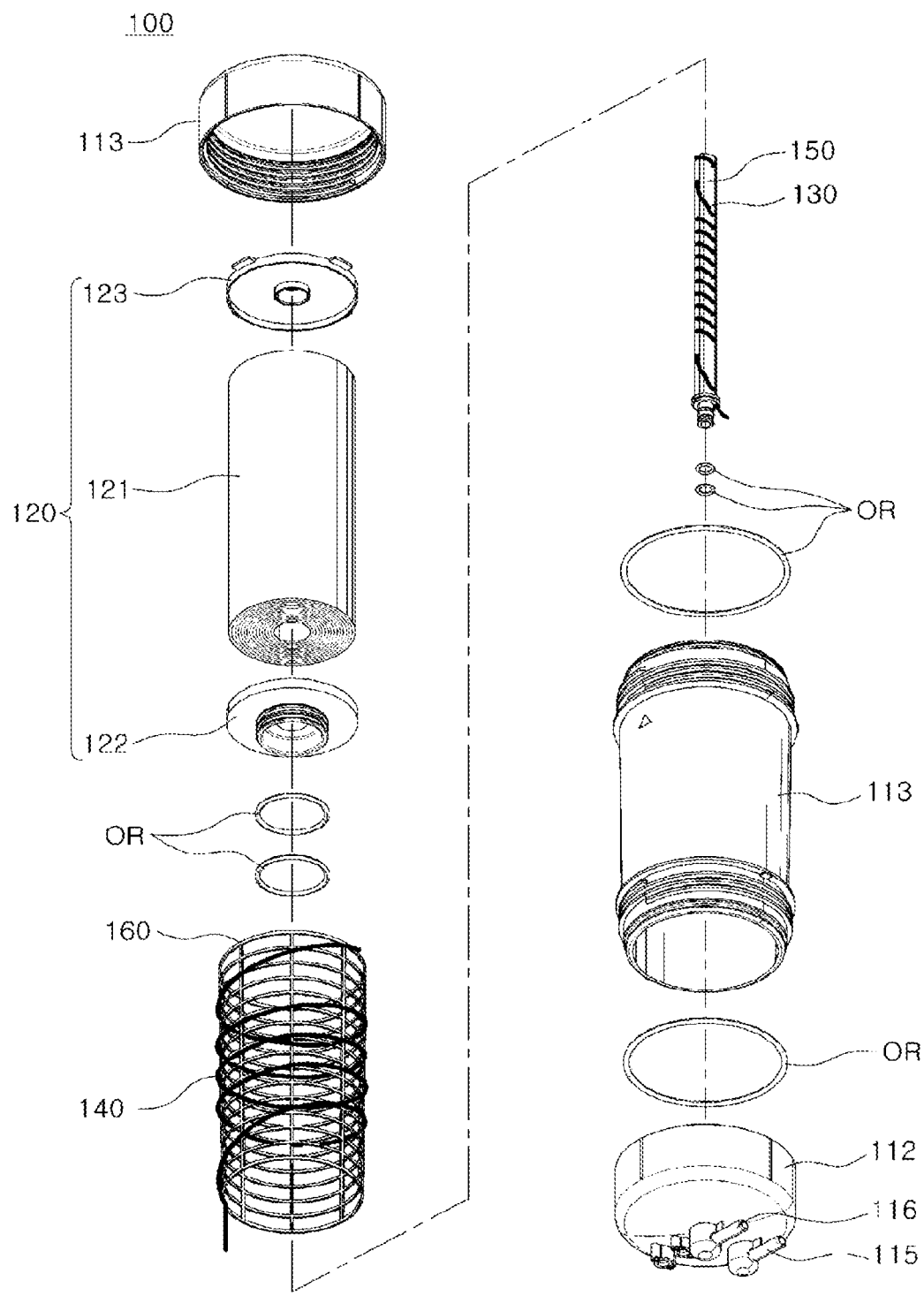
FIG. 4 is an exploded perspective bottom view of the electrodeionization filter of FIG. 3.

For example, as illustrated in FIGS. 3 to 5, the first electrode 130 may be installed in a central portion of the internal space of the housing 110 while the second electrode 140 may be installed in an outer portion of the internal space of the housing 110.

Such first and second electrodes 130 and 140 are electrically connected by a power portion (not illustrated), and accordingly, electricity is applied to the ion exchange portion 121 installed therebetween, thereby adsorbing or detaching ionic substances contained in introduced water on or from the ion exchange portion 121.

The first and second electrodes 130 and 140 may be in a wire form coated by electroplating, chemical deposition, spraying, brush painting, or the like. Titanium is used as a wire base material and has a thickness of 0.5 mm to 3 mm. As a coating material, one or two or more metals selected from the group consisting of platinum, ruthenium, iridium, tin, cobalt can be used. A thickness of the coating may be 0.3 µm to 500 µm.

Meanwhile, an electrodeionization filter 100 according to an example embodiment is installed inside the ion exchange module and may further include a core member 150 in which an outlet through which purified water deionized in the ion exchange portion 121 is discharged.

The first electrode 130 may be formed on an external surface of the core member 150 in a spiral form.

Figure 9:
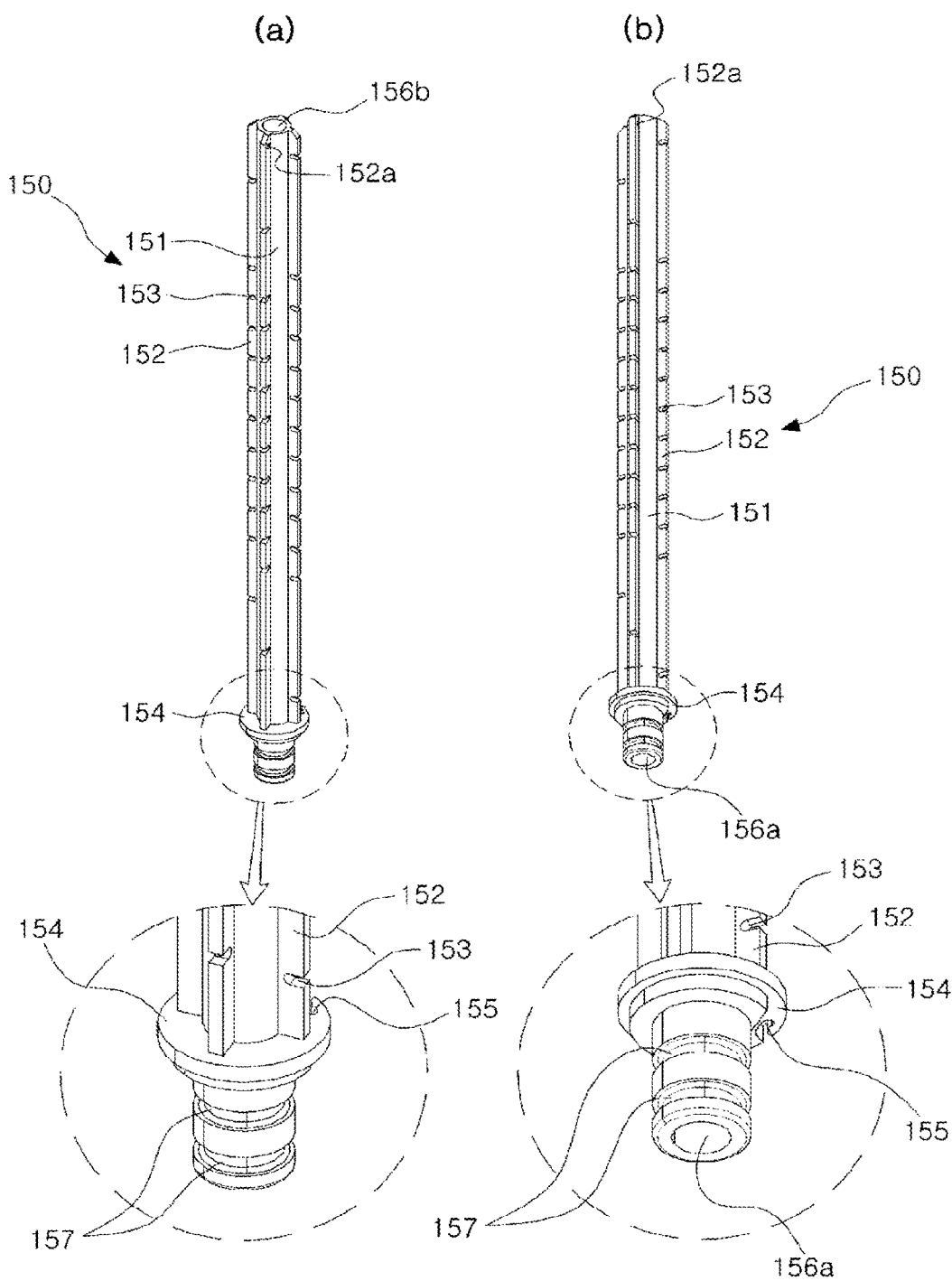
FIG. 9 is a diagram illustrating a core member disposed in an electrodeionization filter according to an example embodiment; (A) is a perspective top view thereof, and (B) is a perspective bottom view thereof.

As specifically illustrated in FIG. 9, the first electrode 130 may be formed with a fitting recess 153 on an outer circumferential surface of the core member 150 such that the first electrode 130 may be coiled around the core member 150 in a pre-determined arrangement. Such a fitting recess 153 facilitates the first electrode 130 to be easily installed correspondingly to the pre-determined arrangement.

Specifically, the core member 150 may be provided with a projection 152 projected outwardly from an external surface of the core body 151, having a hollow structure, and being spaced apart by an equal distance in relation to a circumferential direction. In the projection 152, a fitting recess 153 may be formed to correspond to a coiling structure of the first electrode 130. Further, a fitting hole 152a, to which an end of the first electrode 130 passes through to be fitted, may be formed in an upper end of the core body 151.

A step 154 may be formed in a lower portion of the core member 150 such that a lower cap 122 and the lower portion cover 112 can be coupled. In the step 154, a fixing grove 155 may be formed such that the first electrode 130 can be introduced into the ion exchange module 120.

Accordingly, the first electrode 130 is introduced into the ion exchange module 120 through the fixing groove 155, the first electrode installation hole 117a, and the first electrode installation portion 117 formed in the lower portion cover 112 of the housing 150. The first electrode 130 can be fitted to the fitting recess 153 formed in the core member 150 to be coiled around the core member 150 in a pre-determined arrangement, while an end of the first electrode 130 can pass through the fitting hole 152a to be fixed.

Figure 10:
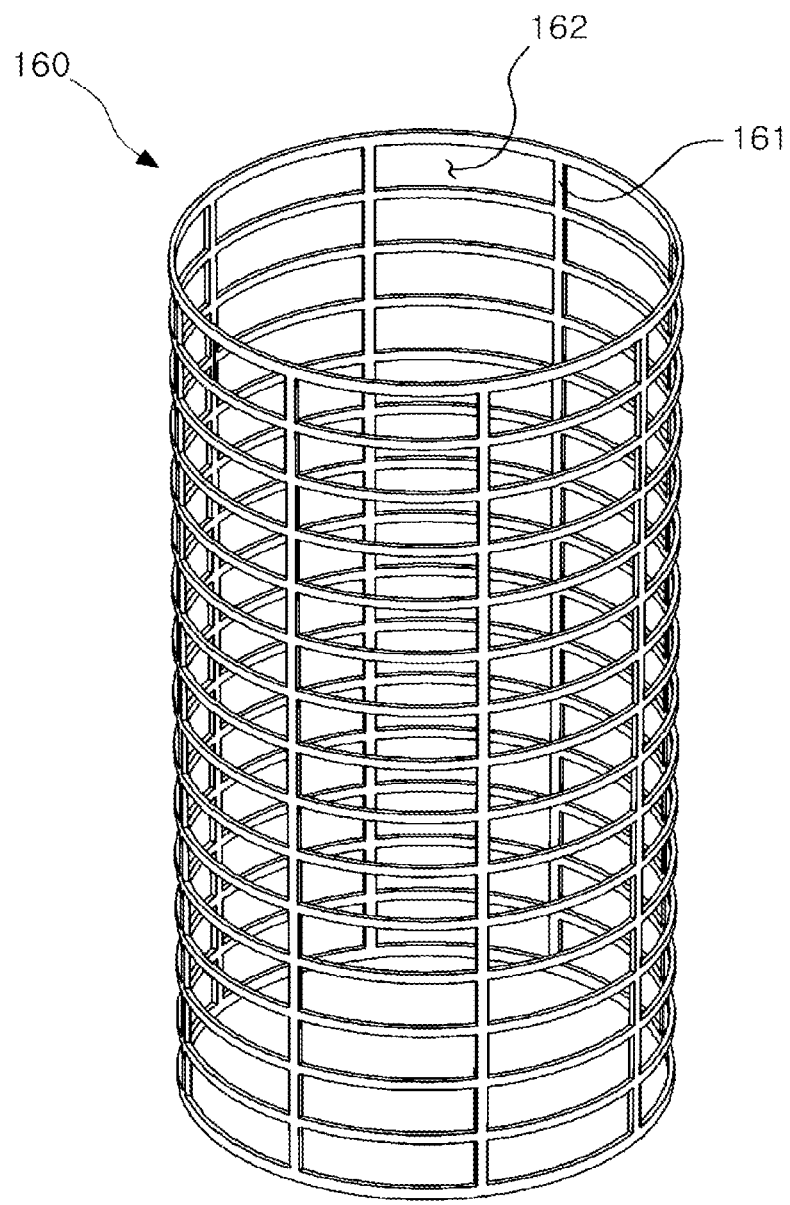
FIG. 10 is a perspective view of a support member disposed in an electrodeionization filter according to an example embodiment.

Alternately, an electrodeionization filter 100 according to an example embodiment may further include a support member 160 installed outside the ion exchange module 120 and disposed with an opening 162. Based on FIG. 10, the support member 160 has a structure in which the opening 162 is formed in a support body 161 having a lattice shape.

The second electrode 140 may be spirally coiled around an external surface of the support member 160. That is, the second electrode 140 is introduced into the housing 110 through the second electrode installation hole 118a and the second electrode installation portion 118 formed in the lower portion cover 112 of the housing 110 and may have a structure of being coiled around an outer side of the support member 160 in a spiral form.

As illustrated in FIGS. 3 to 5, several sealing members OR may be used to prevent leakage when assembling the housing 110, the core member 150 and the ion exchange module 120. In addition, a groove portion 157 may be formed in the core member 150 for installing the sealing members OR.

Meanwhile, based on FIGS. 4, 5, 9 and 10, water introduced into the housing through the water inlet 115 formed in the lower portion cover 112 of the housing 110 passes through the opening 162 of the support member 162 to be introduced into the ion exchange module 120. Ionic substances contained in water introduced as power is applied to the first and second electrodes 130 and 140 are adsorbed to the ion exchange portion 121 of the ion exchange module 120, and the water purified through the ion exchange portion 121 may be discharged to the water outlet 116 through the outlet 156a and the internal space 156 formed inside the core member 150.

Based on FIGS. 3 to 9, an installation structure of the first and second electrodes 130 and 140 will be described.

As for a conventional electrodeionization filter, there have been structures suggested in which the first and second electrodes face each other on one side and the other side in a certain distance and in which the first and second electrodes are installed in a central portion and on an outer side of the housing.

However, there has only been an arrangement proposed for the conventional deionization filter, in which two electrodes are disposed to face each other, without considering lifespans of electrodes. In this regard, the lifespans of the electrodes have not been considered.

According to experiments conducted by the present inventor, it was confirmed that electrode consumption in a central region was large based on a longitudinal direction (height direction) of the housing.

In light of the above, the present disclosure, at least one of the first and second electrodes 130 and 140 may have center regions C and C' having a denser structure as compared to peripheral regions P1, P1', P2 and P2'. That is, due to the dense structure of the electrode in the center regions C and C', overall lifespans of the center regions C and C' can be increased even when the electrode consumption is large in the center regions C and C'.

As illustrated in FIGS. 3, 4, 6 and 8, all the first and second electrodes 130 and 140 may have center regions C and C' having a denser structure as compared to peripheral regions P1, P1', P2 and P2'. That is, in consideration of the electrode consumption, some region may have a denser structure as compared to the other region.

Figure 6:
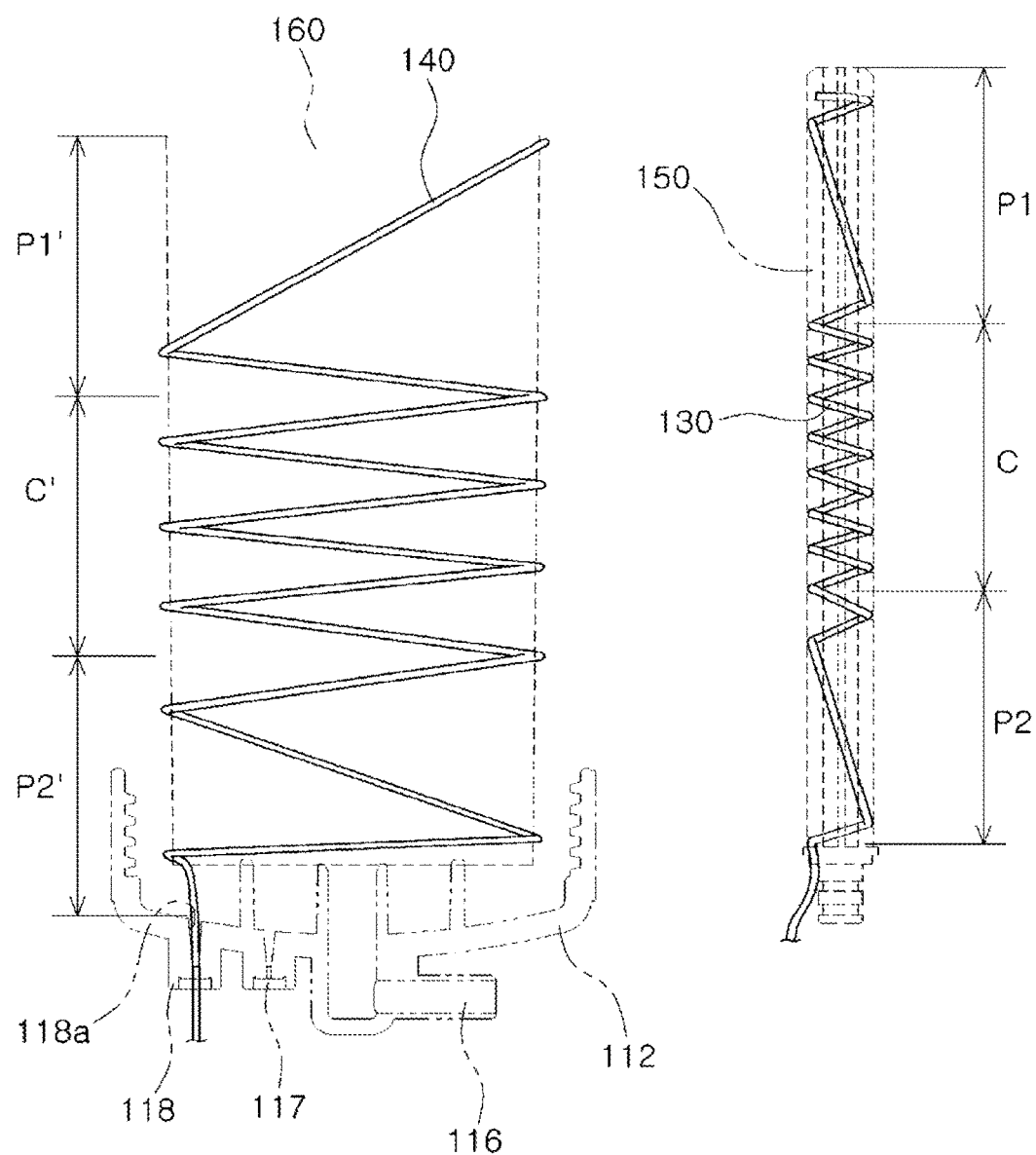
FIGS. 6 to 8 are simplified schematic diagrams illustrating an arrangement structure of first and second electrodes of an electrodeionization filter according to an example embodiment.
Figure 7:
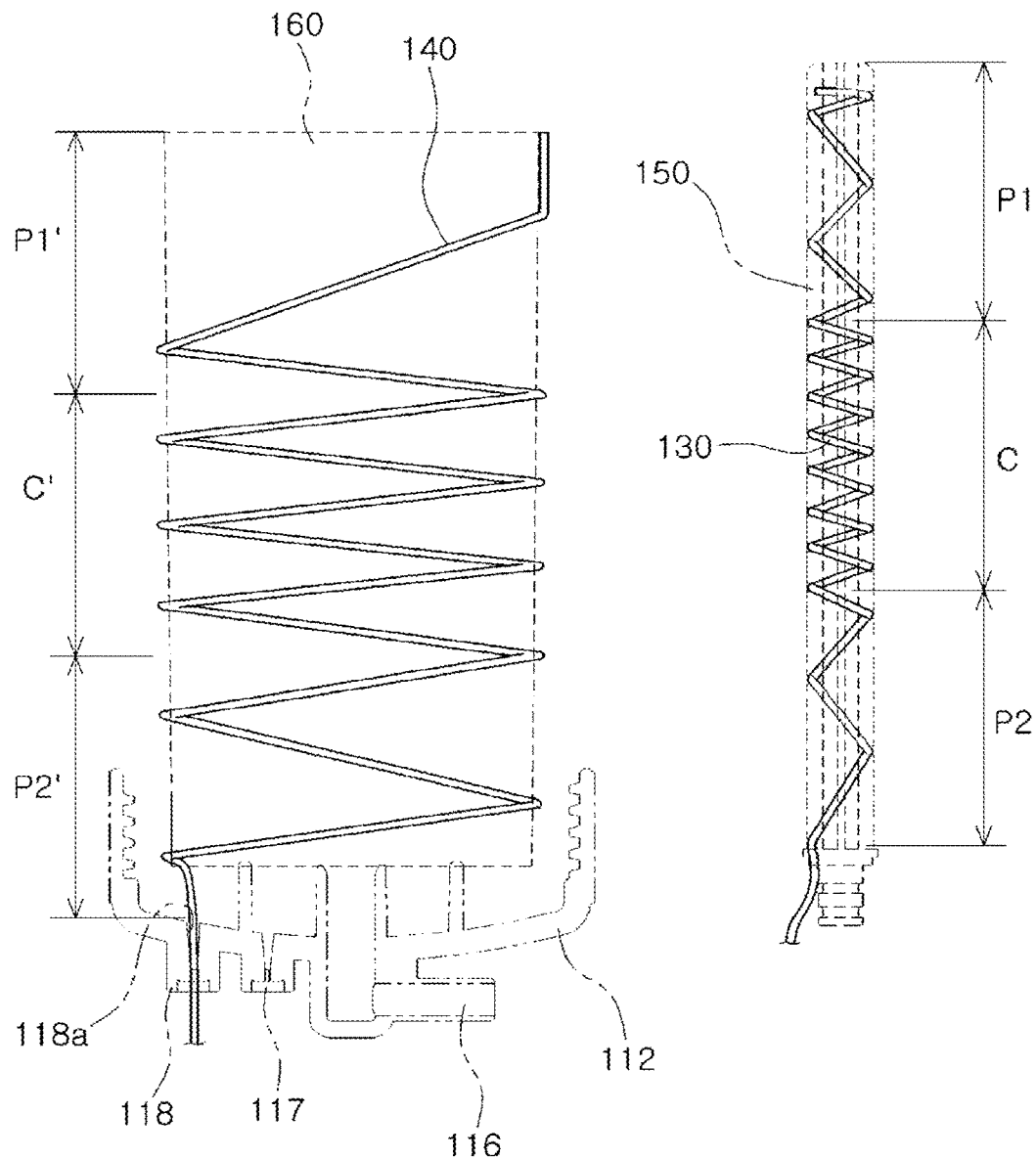
Figure 8:
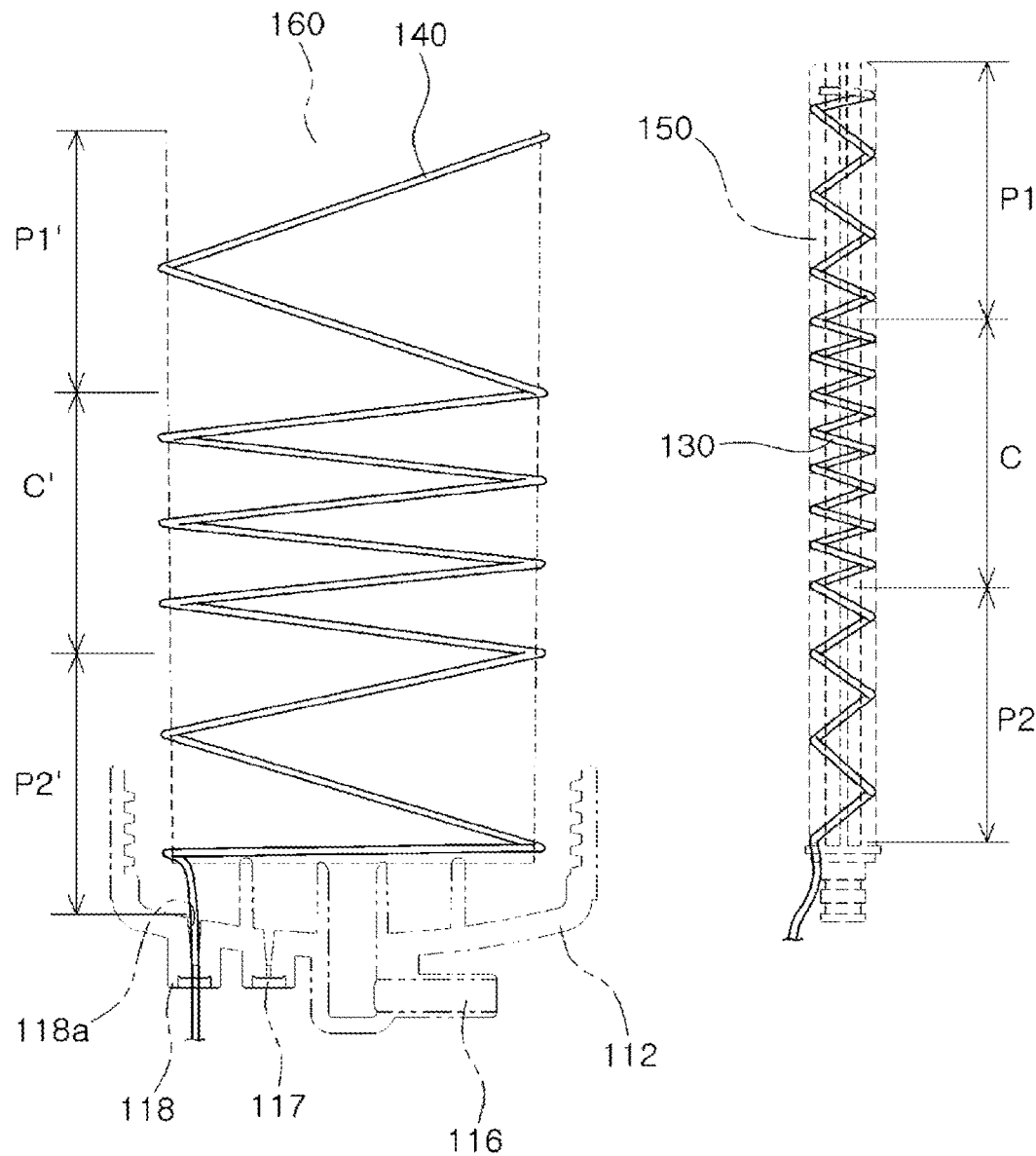

Specifically, as illustrated in FIGS. 6 to 8, the center region C of the first electrode 130 corresponds to the central portion of three equally divided portions between the fixing groove 155 and an upper end of the core member 150, and the peripheral regions P1 and P2 of the first electrode 130 correspond to regions above and below the center region C.

Further, as described above, the second electrode 140 is introduced into the housing 110 through the second electrode installation hole 118a formed on a bottom surface of the housing 110. The center region C' of the second electrode 140 may correspond to the central portion of three equally divided portions between the second electrode installation hole 118a and an upper end of the support member 160, and the peripheral regions P1' and P2' of the second electrode 140 may correspond to the regions above and below the center region C'.

An average electrode pitch of the peripheral regions P1, P1', P2 and P2' of the first and second electrodes 130 and 14 may be two to ten times an average electrode pitch of the center regions C and C'. When a multiple of the electrode pitch is smaller than 2, the electrode consumption in the center regions C and C' is high that an overall lifespan decreases, whereas when a multiple exceeds 10, an amount of electrodes disposed in the peripheral regions P1, P1', P2 and P2' is insignificant that a deionization effect in the peripheral regions P1, P1', P2 and P2' is reduced.

Meanwhile, the electrode pitch of the in the peripheral regions P1, P1', P2 and P2' and the center regions C and C' may have varying structures. In the case in which the electrode pitch varies, an average electrode pitch may be calculated by dividing a number of windings of the electrodes installed in the peripheral regions P1, P1', P2 and P2' and the center regions C and C' by a height of each region.

As the heights of the peripheral regions P1, P1', P2 and P2' and the center regions C and C' are equally divided into three portions, an average electrode pitch of each region can be obtained based on a comparison of the number of windings of each region.

In the case of an example embodiment illustrated in FIG. 6, a number of coiling of the center region C of the first electrode 130 is about 7, and that of the peripheral regions P1 and P2 excluding and end is about 1.5. In the case of an example embodiment illustrated in FIG. 7, a number of coiling of the center region C of the first electrode 130 is about 7, and that of the peripheral regions P1 and P2 excluding and end is about 2.5. In the case of an example embodiment illustrated in FIG. 8, a number of coiling of the center region C of the first electrode 130 is about 7, and that of the peripheral regions P1 and P2 excluding an end portion is about 3.

In the case of an example embodiment illustrated in FIGS. 6 to 8, a number of coiling of the center region C' of the second electrode 140 is about 3, and that of the peripheral regions P1' and P2' is similarly about 1 to 1.5. However, shapes of the coiling are somewhat different.

Meanwhile, the center region C of the first electrode 130 may have a denser structure as compared to the center region C' of the second electrode 140.

That is, as the first electrode 130 is located in the center region inside the housing and thus has a smaller diameter, while the second electrode 140 is located on the outer side of the interior of the housing and thus has a larger diameter, it is preferable that an electrode pitch of the center region C of the first electrode 130 be smaller than that of the center region C' of the second electrode 140.

For example, the average electrode pitch of the center region C of the first electrode 130 may be 2 mm to 10 mm, and the average electrode pitch of the center region C' of the second electrode 140 may be 1 cm to 3 cm.

Meanwhile, in contrast to the above, the center regions C and C' and the peripheral regions P1, P1', P2 and P2' may be determined based on a height at which the first and second electrodes 130 and 140 are in contact with water.

That is, the center region C of the first electrode 130 may be set to correspond to the central portion C of three equally divided portions of an entire height at which the first electrode 130 is in contact with water, and the peripheral regions P1 and P2 of the first electrode 130 may be set to correspond to the regions above and below the center region C. In addition, the center region C' of the second electrode 140 may be set to correspond to the central portion C' of three equally divided portions of an entire height at which the second electrode 140 is in contact with water, and the peripheral regions P1' and P2' of the second electrode 140 may be set to correspond to the regions above and below the center region C'.

In this case, a water level of the housing 110 corresponds approximately to an upper end of the core member 150, and a lower portion where the first electrode 130 comes into contact with water corresponds to the fixing groove 155 formed in the step 154, and can thus be set almost similarly to the center region C and the peripheral regions P1 and P2 of the first electrode 130 illustrated in FIGS. 6 to 8.

In addition, a lower portion where the second electrode 140 is in contact with water corresponds to the second electrode installation hole 118a, and the lower portion where the second electrode 140 is in contact with water corresponds to an upper end of the support member 160 and can thus be set almost similarly to the center region C' and the peripheral regions P1' and P2' of the second electrode 140 illustrated in FIGS. 6 to 8.

While example embodiments have been shown and described above, it will be apparent to those skilled in the art that modifications and variations could be made without departing from the scope of the present disclosure as defined by the appended claims.

REFERENCE NUMERALS

| [Reference Numerals] | |
|---|---|
| 100: | Electrodeionization filter |
| 110: | Housing |
| 111: | Housing body |
| 112: | Upper portion cover |
| 113: | Lower portion cover |
| 115: | Water inlet |
| 116: | Water outlet |
| 117: | First electrode installation portion |
| 117a: | First electrode installation hole |
| 118: | Second electrode installation portion |
| 118a: | Second electrode installation hole |
| 120: | Ion exchange module |
| 121: | Ion exchange portion |
| 121a: | Cation exchange membrane |
| 121b: | Anion exchange membrane |
| 121c: | Gap |
| 122: | Lower cap |
| 122a: | Through-hole |
| 123: | Upper cap |
| 130: | First electrode |
| 140: | Second electrode |
| 150: | Core member |
| 151: | Core body |
| 152: | Projection |
| 153: | Fitting recess |
| 154: | Step |
| 155: | Fixing groove |
| 156: | Internal space |
| 156a: | Outlet |
| 160: | Support member |
| 161: | Support body |
| 162: | Opening |
| C, C': | Center regions |
| P1, P1', P2, P2': | Peripheral regions |
| OR: | Sealing member |

The invention claimed is:

1. An electrodeionization filter, comprising:
a housing equipped with a water inlet and a water outlet;
a first electrode installed inside the housing in a spiral form;
a second electrode installed inside the housing and spaced apart from the first electrode in a spiral form; and
an ion exchange module installed between the first and second electrodes and configured to adsorb or detach an ionic substance in water introduced by electricity applied thereto,
wherein at least one of the first and second electrodes has a structure in which a center region is denser compared to peripheral regions corresponding to regions above and below the center region, and
wherein the center region of the first electrode corresponds to the central portion of three equally divided portions of an overall height at which the first electrode is in contact with water.

2. The electrodeionization filter of claim 1, wherein the first and second electrodes have a structure in which the center region of the first and second electrodes is denser compared to the peripheral region of the first and second electrodes.

3. The electrodeionization filter of claim 2, further comprising a core member installed inside the ion exchange module and formed with an outlet through which purified water deionized in the ion exchange module is discharged,
wherein the first electrode is spirally coiled around an external surface of the core member.

4. The electrodeionization filter of claim 3, wherein the first electrode is introduced into the ion exchange module through a fixing groove formed in the core member,
wherein the center region of the first electrode corresponds to the central portion of three equally divided portions between the fixing groove and an upper end of the core member.

5. The electrodeionization filter of claim 2, further comprising a support member installed outside the ion exchange module and disposed with an opening,
wherein the second electrode is spirally coiled around an external surface of the support member.

6. The electrodeionization filter of claim 5, wherein the second electrode is introduced into the housing through a second electrode installation hole formed in a bottom surface of the housing,
wherein the center region of the second electrode corresponds to the central portion of three equally divided portions between the second electrode installation hole and an upper end of the support member.

7. The electrodeionization filter of claim 1, wherein the center region of the second electrode corresponds to the central portion of three equally divided portions of an overall height at which the second electrode is in contact with water.

8. The electrodeionization filter of claim 1, wherein an average electrode pitch of the peripheral regions of the first and second electrodes is two to ten times an average electrode pitch of the center regions of the first and second electrodes.

9. The electrodeionization filter of claim 8, wherein the average electrode pitch of the center region of the first electrode is 2 mm to 10 mm, and the average electrode pitch of the center region of the second electrode is 1 cm to 3 cm.

10. The electrodeionization filter of claim 3, wherein the core member comprises a fitting recess formed on an outer circumferential surface thereof to fix a position of the first electrode.

11. The electrodeionization filter of claim 1, wherein the center region of the first electrode has a denser structure as compared to the center region of the second electrode.

12. The electrodeionization filter of claim 1, wherein the ion exchange module comprises bipolar ion exchange membrane formed by coupling a cation exchange membrane having a cation exchange resin and an anion exchange membrane having an anion exchange resin.

13. The electrodeionization filter of claim 1, wherein the housing comprises a housing body in which an upper portion and a lower portion are exposed, an upper portion cover covering the upper portion of the housing body and a lower portion cover covering the lower portion of the housing body,
wherein the lower portion cover comprises first and second electrode installation portions through which the first and second electrodes are introduced into the housing, and the water inlet and outlet.

* * * * *